Patented Apr. 7, 1953

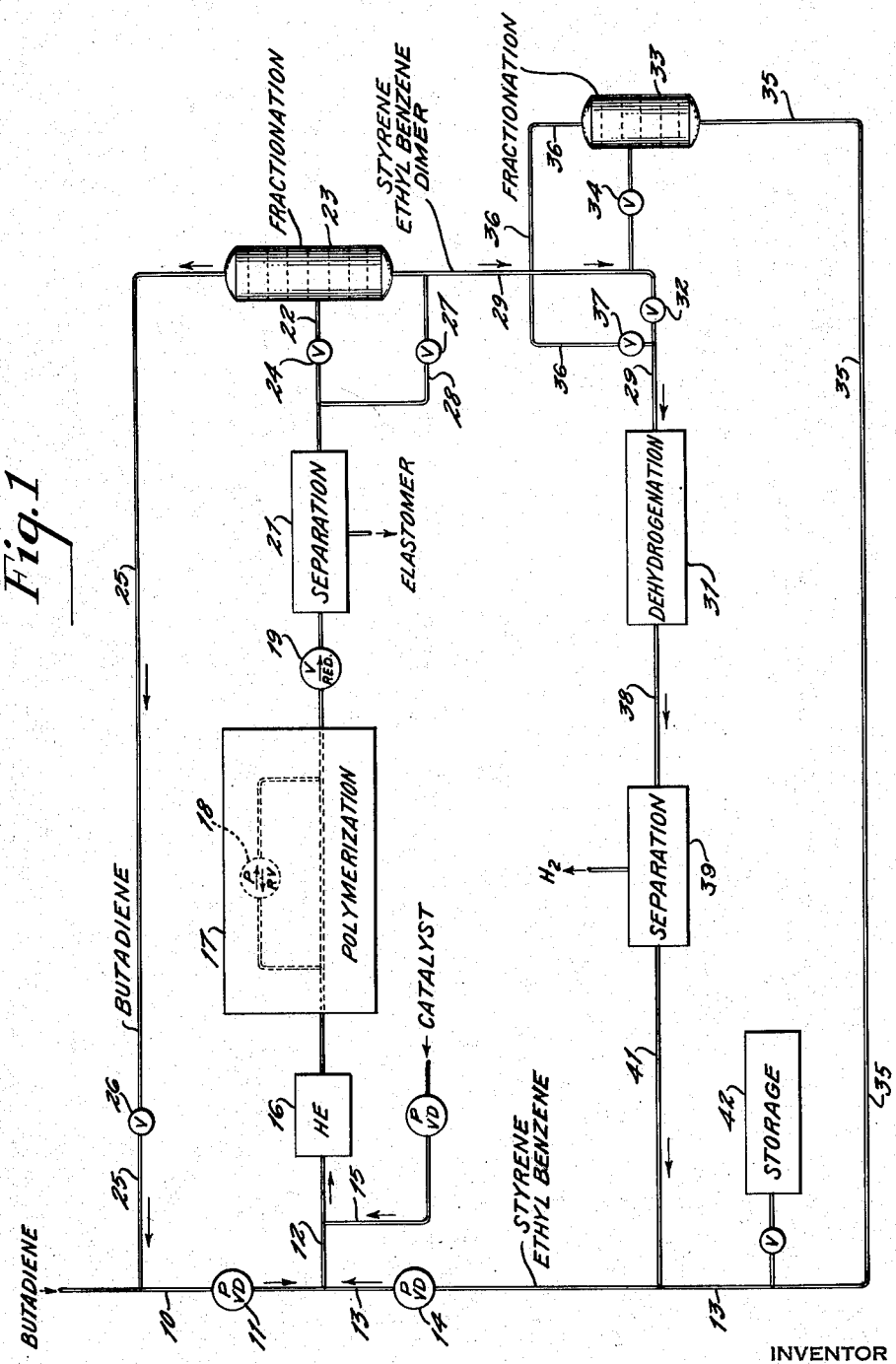

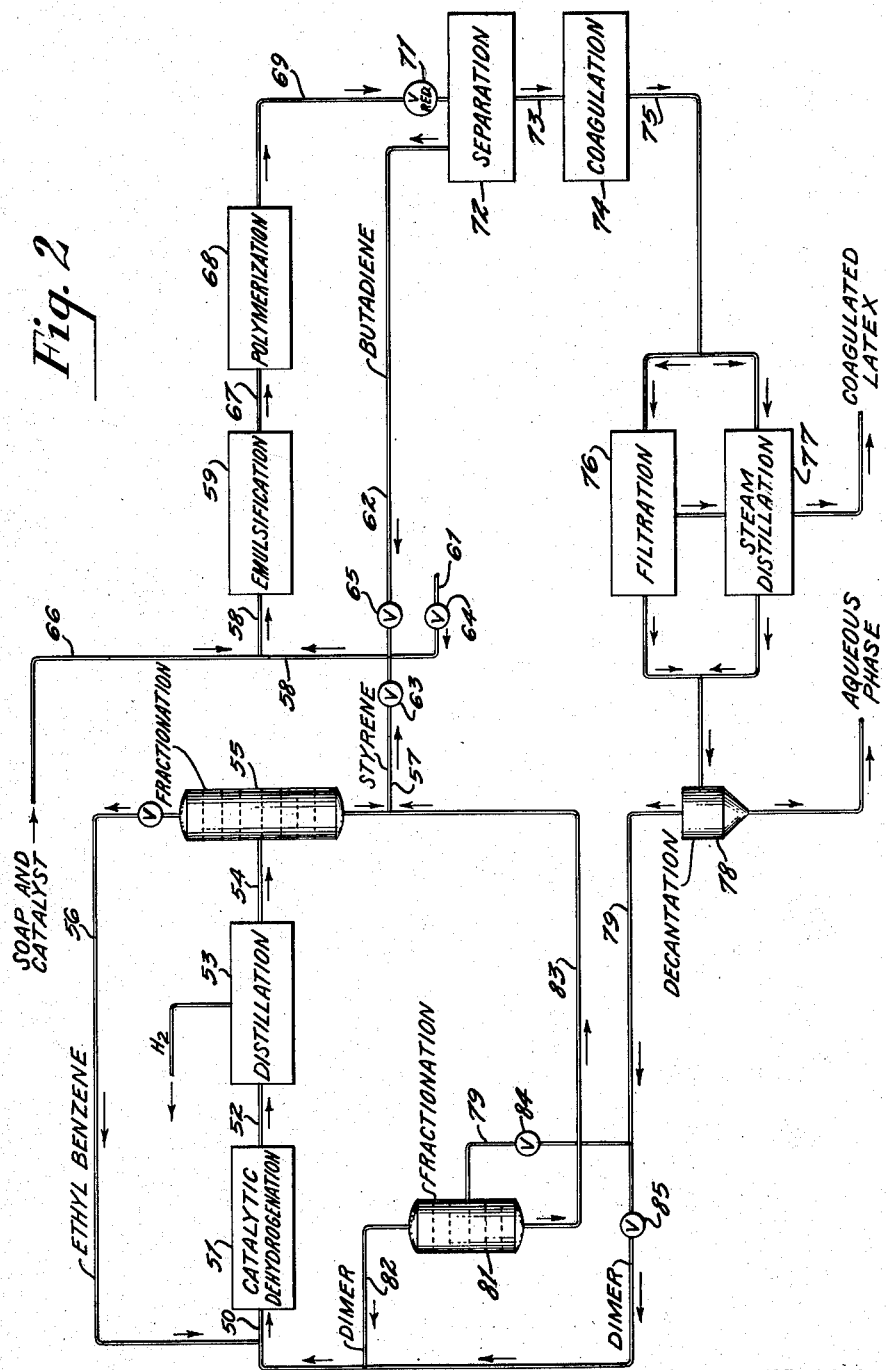

2,634,257

UNITED STATES PATENT OFFICE 2,634,257

PRODUCTION OF HIGH MOLECULAR WEIGHT ELASTIC HYDROCARBON POLYMERS

Warren F. Faragher, Swarthmore, Pa., assignor to Houdry Process Corporation, Wilmington, Del., a corporation of Delaware Application September 11, 1951, Serial No. 245,999

5 Claims. (Cl. 260—83.7)

The present invention relates to new and improved methods for the production of synthetic elastomers of a rubbery nature by the copolymerization of a conjugated diolefin, butadiene, together with an aryl alkene-1, styrene, and is a continuation-in-part of my copending application, Serial No. 95,691, filed May 27, 1949 (now abandoned), which is a continuation-in-part of my application, Serial No. 582,358, filed March 12, 1945, now Patent No. 2,502,444, issued April 4, 1950.

In accordance with the present invention, a high molecular weight elastomer or elastic hydrocarbon copolymer consisting of butadiene and styrene is produced under conditions such that a portion of the butadiene polymerizes to form a cyclic dimer, 4-ethenylcyclohexene; this cyclic dimer is thereafter dehydrogenated to form styrene which then is utilized as at least a portion of the styrene needed for the copolymer. By proper selection of the conditions under which the polymerization is effected, sufficient quantities of 4-ethenylcyclohexene may be formed so that the only raw material needed for the process is butadiene.

In order to understand the invention more fully, reference should be made to the schematic drawings or flow sheets, in Figs. 1 and 2, which flow sheets illustrate various embodiments of the present invention. This invention is not, however, limited in scope thereto.

In Fig. 1 is illustrated a process in which the polymerization is effected in an aromatic hydrocarbon solvent, ethylbenzene. Butadiene from line 10 is introduced by a variable delivery pump 11 to line 12 where it is mixed with styrene and ethylbenzene introduced from line 13 by a variable delivery pump 14. A catalyst, such as lead tetraethyl, nickel carbonyl, sodium, metal or other catalysts known to the art, may be added to the reactants in line 12 through line 15 as a solution or dispersion in a suitable medium such as ethylbenzene. The entire reaction mixture is then passed through a heat exchanger 16 to polymerization zone 17. The reactants are then agitated in the polymerization zone by means of a reciprocating valveless pump 18, the opposite ends of pump 18 being connected with the opposite ends of the reaction zone so that when the piston of this pump reciprocates, the liquid in the reaction zones is alternately withdrawn and recharged at each end. By such a pump, the desired agitation can be maintained within the reaction zone without extending the length of the reaction zone excessively. The temperature and pressure in the polymerization zone are controlled by conventional equipment.

The reaction mixture, after polymerization, is discharged through a pressure reducing valve 19 into a separation zone 21 where separation of the elastomer or copolymer from volatile gaseous or relatively volatile liquid hydrocarbon constituents is effected by known methods such as flash or steam distillation. The separation zone, if desired, may consist of two units, copolymer being removed from one zone while it is being separated from the other constituents in the other, or may be operated continuously, as in the case of flash distillation. The volatile gaseous and relatively volatile liquid hydrocarbon constituents, which comprise ethylbenzene, the cyclic dimer of butadiene (4-ethenylcyclohexene) and any unreacted butadiene or styrene, from separation zone 21 pass, by line 22, to a fractionation zone 23, valve 24 being open. In fractionation zone 23, unreacted butadiene is taken off as an overhead fraction and forwarded to line 10 by line 25, valve 26 being open, so that it is mixed with fresh butadiene to be polymerized. If there is no butadiene present, fractionation zone 23 may be bypassed by opening valve 27, closing valve 24 and passing the mixture through line 28. A fraction containing ethylbenzene and cyclic dimer is removed from the fractionation zone as a bottoms fraction and directed by line 29 to a dehydrogenation zone 31, valve 32 being open. In the event that this fraction contains unreacted styrene, it is preferred to send it to a supplementary fractionation zone 33, by closing valve 32 and opening valve 34. After separation, the styrene is recycled back to the polymerization zone by lines 35 and 13 while the ethylbenzene and the cyclic dimer are forwarded to the dehydrogenation zone by line 36, valve 37 being open.

In the dehydrogenation zone, ethylbenzene and cyclic dimer are contacted with a dehydrogenation catalyst, described more fully below, so as to form a mixture of styrene and ethylbenzene. By proper adjustment of the dehydrogenation conditions, the cyclic dimer is completely converted to ethylbenzene and/or styrene. Since ethylbenzene is employed as the solvent for the process, the advantage is gained that it is not necessary to dehydrogenate the cyclic dimer completely to styrene or to separate the styrene from the less completely dehydrogenated product, ethylbenzene. Furthermore, reaction conditions in dehydrogenation zone 31 may be selected so that a constant and desired ratio of styrene to ethylbenzene is maintained in the effluent products.

The products of dehydrogenation pass through line 38 to a separation zone 39 where hydrogen is separated by known methods and apparatus (e. g., a condensing gas separator) from the liquid dehydrogenation products. Liquid dehydrogenation products containing a mixture of styrene and ethylbenzene are pumped through lines 41 and 13 thence to the polymerization zone or alternately part may be directed to storage zone 42.

The conditions of temperature and pressure employed in polymerization zone 17 are such that liquid or mixed phase conditions are maintained therein. In general, the temperature is preferably at an elevated temperature above room temperature, such as above about 100° F. to below about 400° F. Increased conversion to copolymers results when the temperature is in a preferred upper portion of this range (i. e., from about 150° F. to 350° F.) but is accompanied by an increase in the cyclic dimer. (The formation of the cyclic dimer, 4-ethenylcyclohexene, is adequately discussed in an article by R. F. Robey et al. appearing in "Industrial and Engineering Chemistry," volume 36, page 3, January 1944.) The use of a relatively high temperature is of considerable advantage in effecting the copolymerization at an advantageously rapid rate but is disadvantageous in that the cyclic dimer is formed as a byproduct to a considerable extent, thereby substantially diminishing the yield of desired copolymer from a given amount of butadiene.

In the present invention, the disadvantageous formation of the cyclic dimer becomes an advantage and the conversion of butadiene to the copolymer is effected in an economical manner. From the data given in the cited article, a temperature can be selected such that the amount of dimer formation is sufficient for the process to be self-sustaining (i. e., solely butadiene is needed as a raw material), or the polymerization may be effected so as to obtain greater and lesser amounts of cyclic dimer. In the event that lesser amounts are obtained, the deficiency may be made up by styrene obtained from other sources; when greater amounts are formed, the cyclic dimer so obtained can be dehydrogenated to styrene and employed for the making of styrene plastics.

In another embodiment of the invention illustrated in Fig. 2, the copolymerization is effected in a manner known to the art and referred to as aqueous emulsion copolymerization, from its technique of dispersing droplets of the reactants in an agitated aqueous phase.

Any suitable emulsifying agent, such as is known in the art, may be employed, as for instance, a soap or suitable soap substitute, sodium oleate, sodium stearate, and triethanolamine stearate being desirable soaps for the purpose. Alternatively, any of the soap substitutes known for this purpose may be employed such as fatty alcohol or acid sulfates or sulfonates, such as lauryl sulfate or sulfonate, the sulfate or sulfonate of oleic acid and alkylated naphthalene sulfonic acids, and salts of higher fatty amines. Optionally, an emulsion stabilizer may be added such as glue, agar agar or starch.

The polymerization is conducted in the presence of a known catalyst for emulsion polymerization, as, for example, alkali metal and alkali earth metal peroxides, perborates, or persulfates, diazoamino benzene, benzoyl peroxide, gasoline peroxide and silver oxide. If desired, the polymerization may be conducted in the presence of modifiers, such as dodecylmercaptan or similar known materials, the percentage employed depending upon the temperature of the operation and the specific character of the product desired.

In Fig. 2, the cyclic dimer, 4-ethenylcyclohexene, is introduced by line 50 to a catalytic dehydrogenation zone 51 wherein it is contacted under dehydrogenation conditions so as to form styrene and ethylbenzene, as described below. The effluent product from dehydrogenation zone 51 passes through line 52 to a flash distillation zone 53 in which hydrogen gas is separated from the liquid hydrocarbon products. After removal of the hydrogen, the liquid hydrocarbon products pass through line 54 to distillation zone 55 and are distilled under conditions which minimize or preclude polymerization of the styrene (i. e., under vacuum and/or in the presence of elementary sulfur). Ethylbenzene is removed from distillation zone 55 as the overhead fraction and is recycled to the dehydrogenation zone through lines 56 and 50. The styrene is removed as a bottoms fraction and passes through lines 57 and 58 to an emulsification zone 59 together with fresh butadiene introduced by line 61 or recycled butadiene from line 62, the relative amounts of these materials being controlled by valves 63, 64 and 65. Soap and catalyst solution or suspension is added to the reactants through line 66. The emulsion formed in zone 59 passes through line 67 to a polymerization zone 68 (which may be of the same type as described in connection with Fig. 1) wherein it is polymerized under liquid or mixed phase conditions on a continuous or batchwise basis.

The emulsion, after polymerization, is discharged through line 69 and a pressure reducing valve 71 into a separation zone 72 where separation of any unreacted volatile butadiene is effected.

The relatively nonvolatile remainder of the reaction products passes by line 73 to a coagulation zone 74 in which zone the synthetic latex produced by the copolymerization of butadiene and styrene is coagulated, such as by adding an acid, for example, acetic acid. The coagulated latex as well as the solution passes through line 75 to a filtration zone 76 or a steam distillation zone 77, in which coagulated latex is separated from the supernatant liquid. (If desired the coagulation and filtration or steam distillation may be effected in the same apparatus.) The supernatant liquid, which comprises an aqueous phase containing soap, catalyst and other added materials, and an oil phase containing cyclic dimer and any unreacted styrene is subjected to decantation as in decantation zone 78, the oil phase being thereafter directed, as by line 79, to a distillation zone 81 in which cyclic dimer is separated from any unreacted styrene. The dimer is removed from the distillation zone as an overhead fraction and passes through lines 82 and 50 to the catalytic dehydrogenation zone. Styrene is removed from distillation zone 81 as a bottoms fraction and passes through lines 83, 57 and 58 for recycle to the polymerization zone. In the event that the copolymerization is effected under conditions such that all the styrene is consumed, the oil phase from decantation zone 78 can be sent directly to dehydrogenation zone 51 without further processing, except to remove minor amounts of contaminants that would affect the catalyst dehydrogenation, by closing valve 84 and opening valve 85.

In connection with the processes shown in both Figures 1 and 2, the cyclic dimer of butadiene, 4-ethenylcyclohexene, may be dehydrogenated by either a one step or a two step operation so as to produce a mixture of ethylbenzene and styrene. In the two step method, the cyclic dimer is first dehydrogenated to ethylbenzene such as by contact with known dehydrogenation or aromatization catalysts such as chromium oxide, vanadium oxide, molybdenum oxide and the like, either alone or on a suitable carrier such as activated alumina, zirconia, bauxite, titania and the like, at temperatures in general above 500° F. and below about 850° to 900° F.; the ethylbenzene so formed being thereafter contacted with the same or a similar catalyst in a second step at a temperature above 900° F. to less than 1250° F. at shorter contact times (i. e., higher space velocities) than in the first step so as to convert ethylbenzene to styrene.

Excellent results can be obtained by contacting ethylbenzene with a dehydrogenation catalyst under conditions such that not only is the contact time of the hydrocarbons short but also such that the partial pressure of the products is low. In order to obtain these conditions, the dehydrogenation can be effected under reduced pressure such as from 2 to 8 inches of mercury absolute or steam can be added to the hydrocarbons in the dehydrogenation zone either prior to or at the time of the introduction of the hydrocarbons to the dehydrogenation zone. The amount of such steam preferably should be such that the partial pressure reaction product is less than 0.5 atmosphere, such as 0.1 atmosphere, desirable amounts of steam being between one to four times the weight of the hydrocarbon. Catalysts effective in the reduced pressure operation are in general those used in the first step. Effective catalysts for the operation employing steam are catalysts such as chromium oxide, iron oxide, magnesium oxide, activated charcoals, aluminum or bauxites, especially effective catalysts comprising predominantly an oxide of zinc, beryllium, or zirconium with about 5 to 25 per cent of iron oxide and smaller amounts of a promoter, such as an oxide of an alkali or alkaline earth, and a stabilizer such as an oxide of copper, silver, manganese, nickel, cerium and the like.

The one step operation is operated under somewhat similar conditions to those of the second step of the two step operation. Typical conditions include temperatures in the range of about 1100° to 1250° F., operation at reduced pressures of less than 0.5 atmosphere, contact time of less than 10 seconds and space velocities in the range of 1 to 10 (volumes of liquid hydrocarbons fed per hour per volume of catalyst present). It is preferable to avoid easily reducible oxides in the catalyst since these have a tendency to cause scission of the cycloalkene ring; suitable catalysts are oxides of chromium, molybdenum, vanadium and uranium on carriers such as alumina, zirconia and titania.

Example I

A mixture of 37.5 parts butadiene, 12.5 parts styrene, 50 parts benzene and 1.0 part lead tetraethyl, each by weight, was subjected to continuous polymerization at 350° F. for contact time of 2 hours. An analysis of the product as determined by distillation showed the conversion to 12% heavy polymer and the recovery of 34% dimer based on the amount of butadiene charged.

Example II

A mixture of 100 parts by weight of butadiene and 100 parts of benzene with an added one part of lead tetraethyl were polymerized at 350° F. for 80 minutes. Analysis of the product showed 57% conversion to high molecular weight polymer and 35% conversion to dimer based on the amount of butadiene charged.

Example III

A hydrocarbon mixture of 52.5 parts of butadiene, 17.5 parts styrene and 30 parts benzene, each by weight was emulsified with 1.4 volumes of soap solution per volume of hydrocarbons, (2.0 weight ratio of water to hydrocarbon) the soap solution containing 5 parts by weight of soap, 0.25 part potassium persulfate and 0.3 part dodecylmercaptan. The emulsion was passed through a reaction tube at 275° F. and 600 pounds pressure for 30 minutes. The high conversion to good quality synthetic rubber was accompanied by the production of appreciable amounts of butadiene dimer.

Example IV

In a typical operation of a continuous recycle process, there was fed to a jacketed reaction tube equipped with a valveless reciprocating pump designed for agitation of the contents of the tube, a mixture of 50 parts butadiene, 16.7 parts styrene and 33.3 parts benzene, each by weight, for continuous polymerization in the presence of 1% tetra-ethyl lead by weight of the butadiene and styrene. There is obtained 11–12% conversion of the reactants to elastomer, 30% of the original butadiene charge being converted to dimer, and 46% being recoverable as the monomer. Physical tests subsequently conducted on the vulcanized polymer (50'/45#) were as follows:

Modulus—425 pounds per square inch
Tensile—1550 pounds per square inch
Elongation—760%

The reaction mixture is discharged from the tube into a distillation vessel maintained at atmospheric pressure wherein the volatilizable liquid and gaseous products are separated from the non-volatile polymer by flash distillation. The volatiles including benzene, unreacted butadiene, styrene and 4-ethenylcyclohexene are sent to a fractionating column from which the lowest boiling material, butadiene, is recovered as an overhead fraction, and recycled as part of the butadiene stream being supplied to the polymerization reactor. Benzene, with a cut point of approximately 176–177° F., and styrene, with a cut point of approximately 293° F., likewise are recovered as separate fractions from the fractionating column, and each is returned to the source of supply of these materials for the polymerization step.

The dimer, as another fraction from the fractionation column and having a cut point of approximately 266° F., is separately recovered and sent to a dehydrogenation vessel wherein it is subjected to contact with a fixed bed of chromealumina catalyst (20% chromia on activated alumina) at 1175° F., under a pressure of 0.1 atmosphere, and at a liquid hourly space velocity of 1.5, under which conditions approximately 35% of the dimer is converted to styrene. The styrene thus obtained is separated from the reaction products by distillation and the recovered styrene is sent to a storage vessel from which is drawn the stream of styrene supplied to the polymerization reactor.

Obviously many modifications and variations of the invention as hereinbefore set forth may be made without departing from the spirit and scope thereof and therefore only such limitations should be imposed as are indicated in the appended claims.

I claim as my invention:

1. In a process for the production of a high molecular weight elastic hydrocarbon copolymer consisting of butadiene and styrene wherein butadiene and styrene are polymerized under liquid phase conditions in a polymerization zone so as to form a hydrocarbon mixture comprising substantial amounts of said copolymer, the improvement which comprises effecting said polymerization at a temperature in the range of about 100° to 400° F. in solution in ethylbenzene and concomitantly dimerizing a portion of said butadiene to 4-ethenylcyclohexene, separating from said hydrocarbon mixture a volatile normally liquid fraction comprising ethylbenzene used as solvent and 4-ethenylcyclohexene produced by dimerization of butadiene, forming styrene by dehydrogenation of said normally liquid fraction, and introducing to said polymerization zone styrene formed by dehydrogenation of said normally liquid fraction as at least a portion of the styrene copolymerized to form said high molecular weight elastic copolymer.

2. In a process for the production of a high molecular weight elastic hydrocarbon copolymer consisting of butadiene and styrene wherein butadiene and styrene are polymerized under liquid phase conditions in a polymerization zone so as to form a hydrocarbon mixture comprising substantial amounts of said copolymer, the improvement which comprises effecting said polymerization at a temperature in the range of about 150–350° F. in solution in ethylbenzene and concomitantly dimerizing a substantial portion of said butadiene to 4-ethenylcyclohexene, separating from said hydrocarbon mixture volatile hydrocarbon constituents, separating from said volatile hydrocarbon constituents a fraction comprising ethylbenzene used as solvent and 4-ethenylcyclohexene produced by dimerization of butadiene and a fraction comprising unreacted styrene, forming a mixture of styrene and ethylbenzene by catalytically dehydrogenating said normally liquid fraction, and introducing to said polymerization zone said mixture of ethylbenzene and styrene formed by dehydrogenation and said unreacted styrene as the sole source of the styrene copolymerized to form said high molecular weight elastic copolymer.

3. In a process for the production of a high molecular weight elastic hydrocarbon copolymer consisting of butadiene and styrene wherein butadiene and styrene are polymerized under liquid phase conditions in a polymerization zone so as to form a hydrocarbon mixture comprising substantial amounts of said copolymer, the improvement which comprises effecting said polymerization at a temperature in the range of about 100° to 400° F. as an aqueous emulsion and concomitantly dimerizing a portion of said butadiene to 4-ethenylcyclohexene, separating from said hydrocarbon mixture 4-ethenylcyclohexene produced by dimerization of butadiene, forming styrene by dehydrogenation of said 4-ethenylcyclohexene, and introducing said styrene formed by dehydrogenation of said 4-ethenylcyclohexene to said polymerization zone as at least a portion of the styrene copolymerized to form said high molecular weight elastic copolymer.

4. In a process for the production of a high molecular weight elastic hydrocarbon copolymer consisting of butadiene and styrene wherein butadiene and styrene are polymerized under liquid phase conditions in a polymerization zone so as to form a hydrocarbon mixture comprising substantial amounts of said copolymer, the improvement of employing butadiene as the sole hydrocarbon raw material for the production of said copolymer which comprises effecting said polymerization at a temperature in the range of about 100° to 400° F. as an aqueous emulsion and concomitantly dimerizing a substantial portion of said butadiene to 4-ethenylcyclohexene, separating from said hydrocarbon mixture 4-ethenylcyclohexene produced by dimerization of butadiene, forming styrene by dehydrogenation of said 4-ethenylcyclohexene, and introducing to said polymerization zone only styrene formed by dehydrogenation of said 4-ethenylcyclohexene as the sole source of styrene copolymerized to form said high molecular weight elastic copolymer.

5. In a process for the production of a high molecular weight elastic hydrocarbon copolymer consisting of butadiene and styrene wherein butadiene and styrene are polymerized under liquid phase conditions in a polymerization zone so as to form a hydrocarbon mixture comprising substantial amounts of said copolymer, the improvement which comprises effecting said polymerization at a temperature in the range of about 100° to 400° F. and concomitantly dimerizing a portion of said butadiene to 4-ethenylcyclohexene, separating from said hydrocarbon mixture a volatile normally liquid fraction comprising 4-ethenylcyclohexene produced by dimerization of butadiene, forming styrene by dehydrogenation of said normally liquid fraction, and introducing to said polymerization zone styrene formed by dehydrogenation of said normally liquid fraction as at least a portion of the styrene copolymerized to form said high molecular weight elastic copolymer.

WARREN F. FARAGHER.

REFERENCES CITED

The following references are of record in the file of this patent:

UNITED STATES PATENTS

| Number | Name | Date |
|---|---|---|
| 2,438,041 | Dutcher | Mar. 16, 1948 |